June 16, 1959
A. FOTI
2,891,130
HIGH VOLTAGE AUTOMATIC GROUNDING SWITCH
Filed Feb. 19, 1957
3 Sheets-Sheet 1
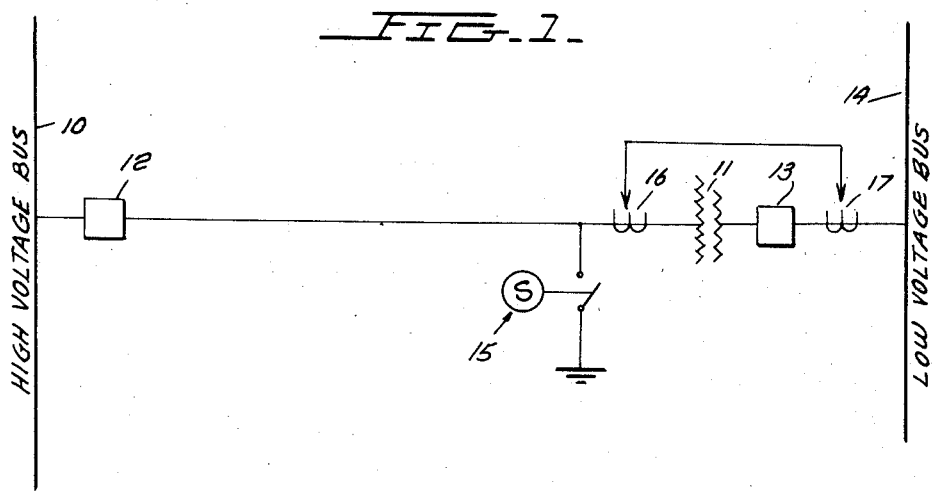
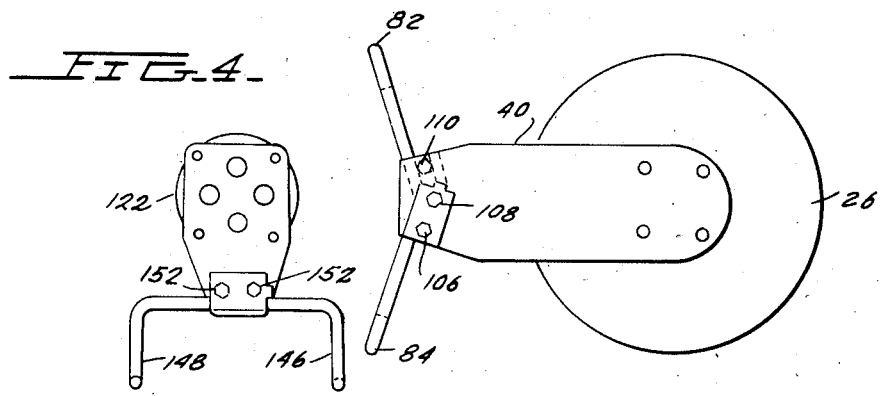
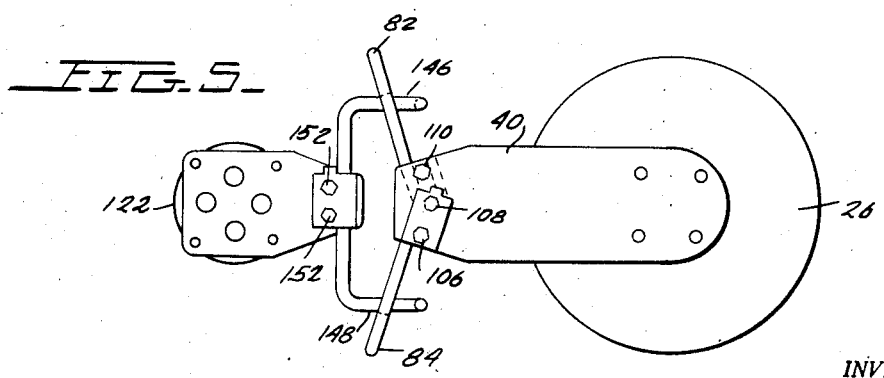
INVENTOR.
AREM FOTI
BY *Ostrolenk, Faber,
Gerb & Soffen*
ATTORNEYS

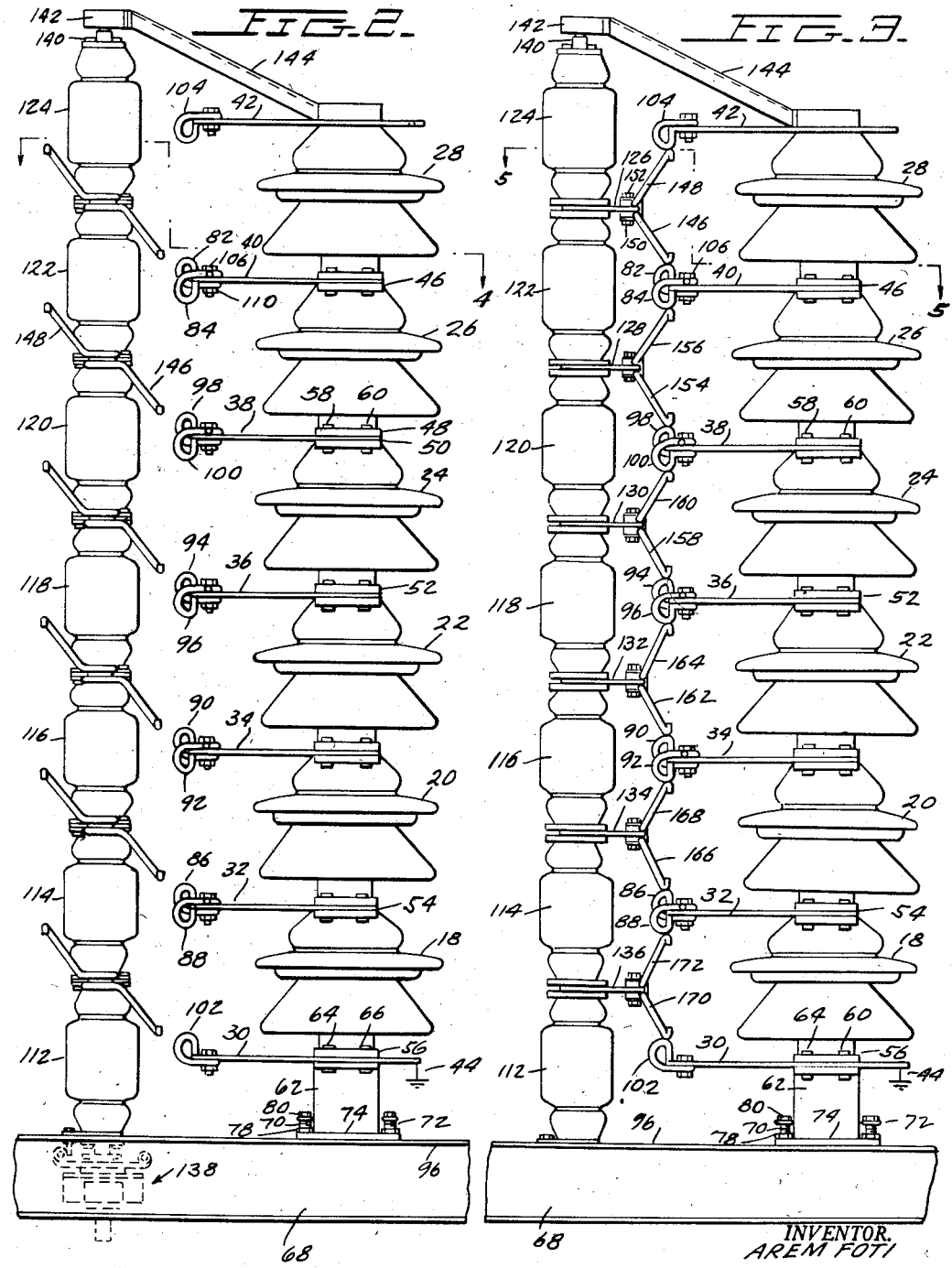

June 16, 1959 A. FOTI 2,891,130
HIGH VOLTAGE AUTOMATIC GROUNDING SWITCH
Filed Feb. 19, 1957 3 Sheets-Sheet 3
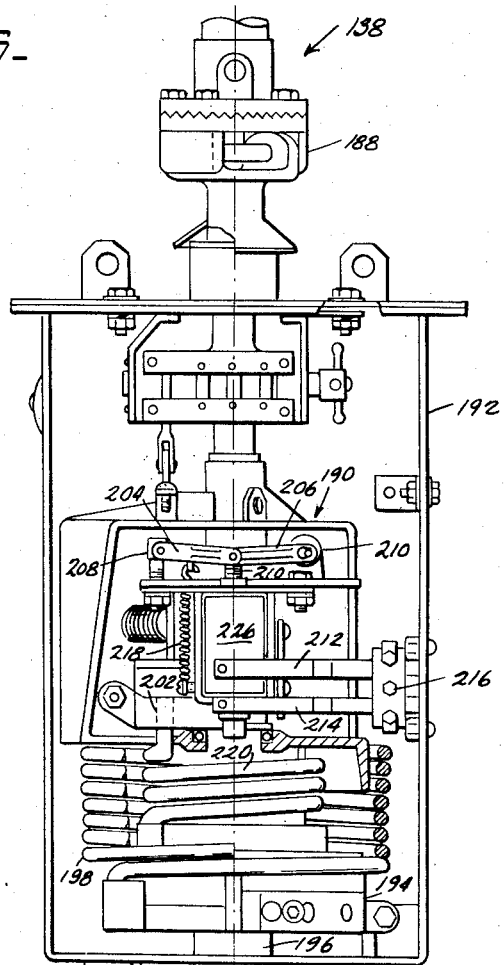
Fig. 6.
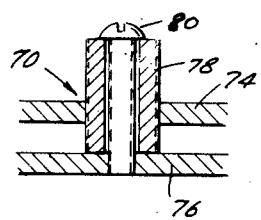
Fig. 2A.
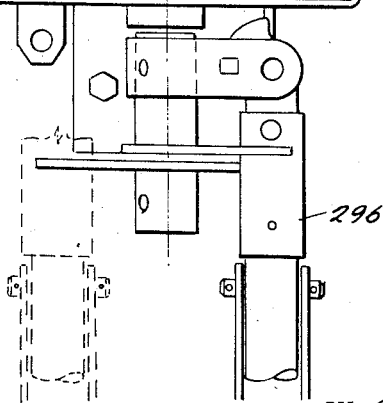
INVENTOR.
AREM FOTI
BY Ostrolenk, Faber,
Gerb & Soffen
ATTORNEYS United States Patent Office 2,891,130

Patented June 16, 1959

2,891,130

HIGH VOLTAGE AUTOMATIC GROUNDING SWITCH

Arem Foti, Greensburg, Pa., assignor to I-T-E Circuit Breaker Company, Philadelphia, Pa., a corporation of Pennsylvania Application February 19, 1957, Serial No. 641,108

3 Claims. (Cl. 200—145)

My invention relates to a high speed automatic grounding switch, and is more specifically directed to a high speed automatic ground switch which utilizes a plurality of series connected breaks.

One common application of automatic grounding switches is to convert a high impedance fault on a transmission line system into a low impedance fault to thereby cause operation of fault responsive protective equipment. By way of example, the switch may be placed in a high voltage transmission line and in front of a transformer bank which converts this high voltage into a low voltage. The low voltage output of the transformer bank is usually taken through a low voltage circuit breaker so as to allow disconnection of the low voltage in the event of a fault in the low voltage system. When, however, the fault occurs in the transformer bank, it is desirable to cause rapid operation of a high voltage circuit interrupting device in the high voltage transmission system. However, the high voltage circuit interrupting equipment may see the fault as a high impedance one which is insufficient to cause their operation. In order to assure operation of the high voltage protective equipment and de-energization of the transformer bank, the automatic grounding switch is operated responsive to a fault in the transformer bank so as to convert this relatively high impedance fault into a low impedance fault on the high voltage transmission line, and cause subsequent energization of the protective high voltage circuit interrupting devices.

It has been the practice to construct this automatic grounding switch of a single long rotatable blade which moves to connect the high voltage line to ground responsive to a fault within a protected zone of the system, this fault being indicated in some cases by differential protective means on either side of the transformer bank.

The movable blade of the presently used grounding switches must be relatively long, this length being determined by the separation between the line and ground contacts which in turn is determined by the line to ground voltage which is to be supported with the switch in its normally open position.

Because of this long length and resultant large moment of inertia of the switch blade, the time required to move the blade to the engaged position has been relatively long, and the power required to move the blade has been high.

The principal object of my invention is to provide a novel multi-break type of contact system for an automatic grounding switch wherein the distance from the ground to line connection is spanned by a plurality of series connected contacts, whereby the radius of gyration of the rotating ssytem can be made extremely low to thereby provide an extremely fast acting automatic grounding switch which may be driven from a driving source of low power requirements and still provides a high degree of economy to the over-all device.

More specifically, I provide a first plurality of contacts which are mounted on a first and stationary shaft, these contacts being spaced from one another and supported in insulated relationship with respect to one another along the axis of said first shaft.

A second shaft carrying a second plurality of bridging contacts is then positioned adjacent said first shaft. The second plurality of bridging contacts are similarly spaced from one another and in insulated relationship with one another and the shaft to which they are mounted is rotatable with respect to the first shaft. The bridging contacts of the second shaft are positioned with respect to the contacts of the first shaft so that rotation of the second shaft will bring each of the bridging contacts into engagement with a respective pair of adjacent contacts on the first shaft so as to electrically connect each of the contacts of this first shaft in series with one another.

Clearly, the last contact of the first shaft could be connected at ground potential, while the first contact is connected to the potential of the line. Thus, by rotating the second shaft responsive to predetermined fault conditions each of the series connected breaks formed by the contacts of the first shaft will be closed to thereby cause automatic grounding of a particular circuit.

Thus in my novel grounding switch, that normal dielectric separation between the line to be grounded and the ground potential is achieved by the plurality of series connected breaks formed by contacts of the first and stationary shaft. When, however, the second shaft is rotated so as to short circuit these plurality of breaks, a line to ground connection is achieved.

The movable contacts of the second rotatable shaft clearly have an extremely small radius of gyration since the dielectric separation is not dependent upon their length in my novel invention.

Thus, the rotating portion of the grounding switch may be rotated extremely rapidly in view of its small radius of gyration, and the force required for this rapid rotation may be reasonably achieved by relatively simple mechanical or electro-mechanical devices which are energized responsive to the fault condition.

Accordingly, the primary object of my invention is to provide a novel high speed automatic grounding switch.

Another object of my invention is to provide a novel automatic grounding switch utilizing a plurality of series connected breaks which are connectable by a respective plurality of rotatable bridging contacts.

A still further object of my invention is to provide an automatic grounding means for grounding a circuit responsive to a predetermined electrical condition which utilizes the rotary motion of a plurality of bridging contacts.

Another object of my invention is to provide a novel automatic grounding switch which has an extremely high operating speed and is yet maintained economical in view of a plurality of low inertia movable bridging contacts which interconnect a respective plurality of series connected stationary contacts axially distributed in insulated relationship with one another along an insulator column.

These and other objects of my invention will become apparent from the following description when taken in conjunction with the drawings in which:

Figure 1 shows a single line wiring diagram illustrating a typical application of an automatic grounding switch.

Figure 2 shows a side plan view of the automatic grounding switch of my novel invention.

Figure 2A shows a cross-sectional view of an adjustable mounting which mounts the insulator stack to the base.

Figure 3 is a view similar to the view of Figure 2 with the automatic grounding switch in a closed position.

Figure 4 shows a view of Figure 2 when taken across the lines 4—4.

Figure 5 shows a view of Figure 3 when taken across the lines 5—5.

Figure 6 shows one type of actuating mechanism that could be utilized to operate my novel automatic grounding switch responsive to the predetermined fault condition.

Referring now to Figure 1 which shows one application of an automatic grounding switch, it is seen that a high voltage station bus 10 energizes a transformer bank 11 over the high voltage circuit breaker 12 where the high voltage circuit breaker 12 and the transformer bank 11 may be separated by many miles. The low voltage side of the transformer bank 11 is taken through a low voltage circuit breaker 13, and the line side of low voltage circuit breaker 13 is then connected to the low voltage station bus 14.

During operation of a system of this type the low voltage circuit breaker 13 will disconnect low voltage bus 14 and the low voltage side of transformer bank 11 responsive to a fault anywhere within the zone of protection between 16 and 17.

When, however, a fault occurs within the transformer bank 11 and in front of low voltage breaker 13, it is possible that this will be a relatively high impedance fault when seen by the high voltage circuit breaker 12 whereby the high voltage circuit breaker 12 would not interrupt the circuit and the transformer bank 11 may be severely damaged.

This condition may be avoided, however, by connecting the automatic grounding switch 15 to the high voltage side of the transformer bank 11, this automatic grounding switch being operative responsive to a fault within transformer bank 11. By way of example, the grounding switch operation could be initiated by the differential protection scheme offered by the current transformers 16 and 17 which are positioned on the high voltage and low voltage side respectively of the transformer bank 11.

In this case when a fault appears in transformer bank 11 the difference in the combined outputs current transformers 16 and 17 will initiate the closing of automatic grounding switch 15. Thus, the high voltage circuit breaker 12 will now see a low impedance fault to ground and will operate to open the high voltage transmission line and thus protect the faulted transformer bank 11.

Clearly, it is desirable that the automatic grounding switch 15 be operated as fast as possible so as to afford maximum protection to the transformer bank 11.

This, however, has been difficult to achieve in the past since, for purposes of economy, it was felt that a single long switch blade was required. This switch blade must be long enough to bridge the distance between the high voltage line potential and ground and because of this, the switch blade has a large radius of gyration and a correspondingly large moment of inertia.

Thus, the operation of the switch was relatively slow and it required a relatively large source of driving power.

I have found, however, that I can provide a device which features the same economics as does the single long blade type of switch, but yet imparts a relatively small moment of inertia to its moving components so as to allow relatively high speed operation.

A preferred embodiment of my novel invention is set forth in Figures 2, 3, 4 and 5 wherein Figures 2 and 4 show side and sectional views respectively of my novel grounding switch in the open position, while Figures 3 and 5 which are side and sectional views respectively, show my novel grounding switch in a closed position.

It is to be understood that these figures show only one pole of a grounding switch, and that in a particular application, any number of these poles could be ganged in any well known manner to serve multiphase purposes.

Referring now to Figures 2, 3 and 5, it is seen that the novel grounding switch includes a first stack of relatively stationary insulators 18, 20, 22, 24, 26 and 28. Contact support members 30, 32, 34, 26, 28, 40 and 42 are then held between adjacent insulators with contact support member 30 fastened to the base of insulator 18, and connected to ground potential 44, while the contact support member 42 is fastened to the top of insulator 28 and is connectible to a line potential.

More specifically, each of insulator supports 18, 20, 22, 24, 26 and 28 are provided at their top and bottom with an outwardly flanged collar, such as the collars 46 and 48 of insulator 26, collars 50 and 52 of insulator 24, and collars 54 and 56 of insulator 18. Each of these collars contains apertures around their peripheries, which apertures allow passage of a bolt means such as the bolts 58 and 60 which pass through registering apertures in collars 48 and 50 of insulators 26 and 24 respectively.

The contact support members such as the support member 38 are provided with apertures which register with the apertures in the collars between which they are positioned so that, upon assembly, the contact support members may be rigidly fastened between their specific insulator columns.

In a similar manner contact support member 30 is fastened between collar 56 of insulator 18 and the collar of a support member 62 by means of bolts 64 and 66 which fastens insulator 18 and support member 62 to one another with the contact support member 30 interposed therebetween.

The complete stack is then fastened to a support base 68 by means of a plurality of support screws such as the screws 70 and 72 which are constructed to maintain the stack to the base as well as to provide an adjustment in the angular position of the stack in respect to the base.

More specifically, these mounting screws are constructed, as is set forth in Figure 2A which shows the bottom flange 74 of support member base 62 as being positioned adjacent the flange 76 of base 68, which could be an I beam, the flange 64 having a screw 78 threaded therethrough and in butting engagement with the flange 76.

A second screw 80 of smaller diameter is then threaded through the central portion of screw 76 and into engagement with a cooperating thread in the flange 76. Thus, by altering the depth of penetration of screw 78 in the cooperating tapped hole in flange 74, the distance between flanges 74 and 76 may be controlled, and the screw 80 may be thereafter tightened so as to secure the flanges 74 and 76 with respect to one another.

Clearly, by providing at least three of the heretofore described adjustable fastening means for fastening the bottom of the insulator stack to the base, the angular position of the insulator stack may be easily controlled with respect to the base 68.

As may be best seen in Figures 4 and 5, each of the contact support members have contact engaging means fastened at their outward end. Thus, the contact support member 40 has the contact engaging means 82 and 84 flaring out therefrom for engagement with respective bridging contacts, as will be described hereinafter.

Each of contact support arms 32, 34, 36, and 38 have a similar type of contact engaging means arrangement, as that shown in Figures 4 and 5 for the case of contact support member 40. Thus, as is best seen in Figure 2, contact support member 34 is associated with contact engaging means 90 and 92, support member 36 is associated with contact engaging means 94 and 96, while support member 38 is associated with contact engaging means 98 and 100. Clearly, each contact 86, 90, 94 and 98 are identical in construction with contact 82 of Figure 4, while contacts 88, 92, 96 and 100 are identical to the contact 84 of Figure 4.

Contact support members 30 and 42 also have contact engaging means, the support member 30 having a single contact engaging means 102 which is identical to contact engaging means 104 associated therewith which is identical in construction to the contact engaging means 84 of Figure 4.

While the above described contact engaging means could be mechanically fastened to their respective support members in any desired manner, I have shown in the illustrated figures and for illustrative purposes only, that the ends of the contact engaging means are bent in a U-shape, and a bolt means thereafter clamps this U-shape portion to the associated support member.

By way of example, Figures 2 and 4 show the contact engaging means 84 as being fastened to support member 40 by the bolt means 106 and 108, while contact engaging means 82 is fastened to support member 40 by a bolt means 110 and a second bolt which is not seen in the figure.

The stationary structure described hereinabove clearly defines the plurality of breaks which isolate the potential of the contact support member 42 from a ground potential at contact support member 30.

In order to bridge this multibreak system when it is desired to connect the line to the ground potential, I provide a rotatable column of insulators which comprises the stacked insulators 112, 114, 116, 118, 120, 122 and 124. Each of the rotatable insulators are provided at their tops and bottoms with a collar arrangement similar to the collar arrangement described hereinabove for the stationary stack of insulators for clamping bridging contact member supports (Figures 3 and 5) 126, 128, 130, 132, 134 and 136 between adjacently positioned insulator members.

The bottom insulator member 112 of the rotatable insulator stack is pivotally mounted on a bearing and has a shaft which is connected to an operating mechanism 138, which will be described more fully hereinafter, while the uppermost insulator member 124 has its top fastened to a cylindrical member 140 which is rotatably mounted within a bushing 142, this bushing being interconnected to the top of stationary insulator 28 by the structural member 144.

The outward ends of contact support members 126, 128, 130, 132, 134 and 136, which are made of material which is a good current conductor, have fastened on opposite surfaces a first and second contact finger which serves as a bridging contact. Thus, contact support 126 has the bridging contact 146 and 148 connected thereto by the bolt means 150 and 152 respectively. Similarly, contact support members 128, 130, 132, 134 and 136 have the contacts means 154—156, 158—160, 162—164, 166—168, and 170—172 respectively associated therewith, by clamping means similar to the bolt means 150 and 152.

In operation, when the rotatable insulator column including the insulators 112, 114, 116, 118, 120, 122 and 124 is in the position shown in Figures 2 and 4, the line potential of contact support member 42 will be isolated from the ground potential at contact support member 30 by the complete distance of the insulator stack, including insulator members 18, 20, 22, 24, 26 and 28.

When, however, the rotatable insulator stack rotates in a counterclockwise direction from the position of the Figures 2 and 4 to the position of Figures 3 and 5, the bridging contacts of the rotatable insulator will engage respective stationary contacts of the stationary insulator column so as to connect each of the stationary contacts in series, and thereby electrically connect the line potential at support member 42 directly to the ground potential at the support member 30 through the electrical connection seen in Figure 3 as comprising contact support member 42, contact engaging means 104, bridging contact members 148 and 146, stationary contacts 82 and 84, bridging contact members 156 and 154, stationary contacts 98 and 100, and so on to the connection of bridging contact members 170 and 172 to the stationary contact 102 and support member 30.

It is to be noted that the rotatable component of my novel invention has an extremely small radius of gyration. In fact, in my novel device the effect of radius of gyrations is substantially negligible as compared to the heretofore used long switch blade devices. Accordingly, in operation my novel device can be operated to the grounding position within a few cycles when operating on a 60 cycle system.

It is to be further noted that the specific construction set forth in Figures 2, 3, 4 and 5 requires only a moderate source of driving power to achieve this extremely high operating speed in view of the low moment of inertia of the rotating system.

Furthermore, this novel construction can be easily adjusted to provide adequate contact pressure between the bridging contact and stationary contacts at any one of the break points along the axis of the system by merely bending the outwardly extending stationary contact engaging means in an appropriate manner.

One type of operating means which could be utilized to drive the switch of Figures 2 through 5 is set forth in Figure 6 and comprises a spring type driving means. However, it is to be specifically noted that the device of Figure 6 is set forth for illustrative purposes only, and the driving means for operating my novel grounding switch could be of any desired type.

The spring driving means of Figure 6 is comprised of an output shaft 188 which engages operating means 138 of the rotatable insulator column by a tooth engagement, this output shaft being rigidly connected to the cradle 190 housed within housing 192. The cradle 190 is more specifically supported from an extension ring 194 which is fastened to the manual operating shaft 196 which passes through housing 192 and is rotatable with respect thereto by the crank member 296 which is shown in the switch open position in solid lines and in the switch closed position in the dotted lines.

Thus, for manual operation of the switch, rotation of handle 296 between the solid and dotted positions will deflect the main and kick-off springs 198 and 200 respectively, and latch the spring-load shaft 196 to cradle 190, after which rotation of handle 296 to solid position will rotate the rotatable insulator column from the position of Figure 2 to the position of Figure 3.

The spring operating mechanism for automatic operation includes the main and "kick-off" springs 198 and 200 respectively, which are connected between the ring 194 and the cradle 190 for rotating cradle 190 with respect to ring 194, and hence to close the multi-break switch.

The upper end of spring 198 is directly fastened to cradle 190 while its lower end is connected to ring 194 which is angularly adjustable to adjust the initial force of spring 198.

Spring 200 has one end fastened to ring 194 and its upper end is fastened to an adjustable arm 202 on cradle 190 so that its operating force is adjustable independently of the main spring 198.

A latch and trip assembly for normally preventing rotation of cradle 190 by springs 198 and 200 comprises the trip links 204 and 206 and the trip magnet assembly 226. Trip link 204 has one end thereof pivotally connected to latch 208 of cradle 190 while one end of link 206 is pivotally connected to member 210 which is stationarily mounted with respect to cradle 190. The opposite ends of these links are then pivotally connected to form a toggle which is broken downwardly against the stop 210 of trip magnet assembly 226.

Thus, with the trip links in the toggle position shown in Figure 6, rotation of cradle 190 with respect to ring 194 is prevented.

Although not shown, a solenoid plunger extends through an aperture in stop 210 and is forcefully pushed against the knee of the toggle formed by trip links 204 and 206 to break the toggle upwardly against the bias of spring 218 responsive to energization of the magnet coil over conductors 212 and 214 fastened to terminal means 216.

Once this toggle is broken, the force of springs 198 and 200 is no longer restrained and the cradle 190 will be rapidly rotated to operate the switch connected at output shaft 188. This operation will be particularly fast in view of the low inertia load on the output shaft 188 as offered by my novel low inertia switch.

It is to be noted that the switch mechanism of Figure 6 is trip free since for automatic operation, the cradle 190 is rotated while ring 194, which is directly connected to the manual operating means remains stationary. Thus, if a maintenance man closes the switch on a fault, only the internal operating mechanism will operate to open the switch and the manual operating means loses control of the closing function.

Although I have described preferred embodiments of my novel invention, many variations and modifications will now be obvious to those skilled in the art, and I prefer therefore to be limited not by the specific disclosure herein but only by the appended claims.

I claim:

1. A switching device; said switching device comprising a first insulator means having a plurality of contacts spaced along the axis thereof in insulated relationship with one another; a first contact of said plurality of contacts positioned toward one end of said first insulator means being connectable to a first potential, a second contact of said plurality of contacts positioned toward the opposite end of said first insulator means being connectable to a second potential; a second insulator means having bridging contacts spaced along the axis thereof and in insulated relationship with one another, and an operating means operatively connected to said second insulator means; said second insulator means being positioned adjacent and parallel to said first insulator means and being rotatable with respect thereto responsive to operation of said operating means; each of said bridging contacts spaced along the axis of said second insulator means being positioned to move into bridging contact engagement with pairs of adjacent contacts of said plurality of contacts of said first insulator means responsive to rotation of said second insulator means to thereby electrically connect said first contact to said second contact; said first insulator means comprising a longitudinal stack of individual insulators, each contact of said plurality of contacts being clamped between adjacent ends of a respective pair of adjacent insulators; each said pair of adjacent insulators and said contact clamped therebetween being clamped by a common clamping means.

2. A switching device; said switching device comprising a first insulator means having a plurality of contacts spaced along the axis thereof in insulated relationship with one another; a first contact of said plurality of contacts positioned toward one end of said first insulator means being connectable to a first potential, a second contact of said plurality of contacts positioned toward the opposite end of said first insulator means being connectable to a second potential; a second insulator means having bridging contacts spaced along the axis thereof and in insulated relationship with one another, and an operating means operatively connected to said second insulator means; said second insulator means being positioned adjacent and parallel to said first insulator means and being rotatable with respect thereto responsive to operation of said operating means; each of said bridging contacts spaced along the axis of said second insulator means being positioned to move into bridging contact engagement with pairs of adjacent contacts of said plurality of contacts of said first insulator means responsive to rotation of said second insulator means to thereby electrically connect said first contact to said second contact; said first insulator means comprising a longitudinal stack of individual insulators, each contact of said plurality of contacts being clamped between adjacent ends of a respective pair of adjacent insulators; each said pair of adjacent insulators and said contact clamped therebetween being clamped by a common clamping means; each of said contacts of said plurality of contacts interposed between said first and second contacts comprising a first and second outwardly extending portion; said first portion being engageable by one of said respective bridging contacts, said second portion engaging the other of said respective bridging contacts.

3. A switching device; said switching device comprising a first insulator means having a plurality of contacts spaced along the axis thereof in insulated relationship with one another; a first contact of said plurality of contacts positioned toward one end of said first insulator means being connectable to a first potential, a second contact of said plurality of contacts positioned toward the opposite end of said first insulator means being connectable to a second potential; a second insulator means having bridging contacts spaced along the axis thereof and in insulated relationship with one another, and an operating means operatively connected to said insulator means; said second insulator means being positioned adjacent and parallel to said first insulator means and being rotatable with respect thereto responsive to operation of said operating means; each of said bridging contacts spaced along the axis of said second insulator means being positioned to move into bridging contact engagement with pairs of adjacent contacts of said plurality of contacts of said first insulator means responsive to rotation of said second insulator means to thereby electrically connect said first contact to said second contact; said first insulator means comprising a longitudinal stack of individual insulators, each contact of said plurality of contacts being clamped between a respective pair of adjacent insulators; each said pair of adjacent insulators and said contact clamped therebetween being clamped by a common clamping means; said second insulator means comprising a longitudinal stack of individual insulators, a bridging contact of each of said bridging contacts being clamped between adjacent ends of a respective pair of said last mentioned adjacent insulators; each of said last mentioned pair of adjacent insulators and said bridging contact clamped therebetween being clamped by a common clamping means.

References Cited in the file of this patent

UNITED STATES PATENTS

| 976,549 | Cheney | Nov. 22, 1910 |
| 2,223,731 | Lingal | Dec. 3, 1940 |
| 2,223,901 | Scarpa | Dec. 3, 1940 |